3,312,650
BINDER COMPOSITION (1) A CONDENSATE OF PHENOL, FURFURYL ALCOHOL AND FORMALDEHYDE AND (2) ADDITIONAL FURFURYL ALCOHOL
Arthur J. Case, Bainbridge, and Royden C. Rinker, Sidney, N.Y., assignors to The Borden Company, New York, N.Y., a corporation of New Jersey
No Drawing. Filed May 20, 1964, Ser. No. 368,994
5 Claims. (Cl. 260—29.3)

This invention relates to a binder composition.

The composition is particularly useful in bonding sand or other particles and the invention will be first illustrated in connection with such use, as in making cores and molds for casting molten metals thereagainst.

In such casting, the introduction of nitrogen, boron, sulfur or phosphorus into certain metals or alloys is objectionable.

The present invention avoids such introduction and provides a binder of satisfactory pot life and strength after setting.

Briefly stated, the invention comprises the combination of a phenol-furfuryl alcohol-formaldehyde condensate with a curing catalyst of special kind.

The curing catalyst should be an acid of dissociation constant greater than $5 \times 10^{-3}$ consisting essentially of carbon, hydrogen and oxygen and halogen substitution products thereof, such as the chloro- or fluoro-compounds. For best results the dissociation and constant should be be above $10^{-2}$. The term "consisting essentially of" means free from elements which, if present, would modify the functioning of the curing agent in significant manner and, particularly, free from nitrogen, boron, sulfur and phosphorus and compounds thereof. Examples of the catalysts of curing that may be used are the water soluble di- and tri-halo substitution products of aliphatic acids such as di- and trichloro- and mono-, di- and trifluoro-substitution products of acetic acid, propionic and butyric acids and unsubstituted oxalic acid. Trichloracetic is the acid recommended for best results and relative economy.

The following table shows proportions of the materials which are reacted to give the three-component condensates, first as those that are permissible and then those that are recommended for commercial operations.

| Component | Proportions, Molar | |
|---|---|---|
| | Permissible | Recommended |
| Phenol | 1 | 1 |
| Furfuryl alcohol | 0.2–2 | 1.2 |
| Formaldehyde | 1–3 | 1.75 |

Any amounts of the furfuryl alcohol above 0.2–0.5 mole is suitably admixed after the condensation is effected. Such additional furfuryl alcohol is about 0.2–1.5 moles.

The condensation with furfuryl alcohol is made in an acid medium and that with formaldehyde in alkali medium, water being the solvent in both steps. In a representative preparation, the acid step of the condensation is first made with an admixed acid known to be effective in condensing phenol and furfuryl alcohol. It is used in amount to establish the pH below about 2.5 and suitably at 0.6–1. Examples of acids to be selected are maleic acid or anhydride, oxalic or phosphoric acid, and any mono- or di-carboxylic aliphatic acid of constant of ionization large enough to give the pH below 2.5. Hydrochloric acid is not recommended for use in iron, because of corrosiveness.

The alkali used in the formaldehyde condensation is any one known to be effective in condensing phenol with formaldehyde, examples being the alkali metal hydroxides or carbonates, sodium hydroxide being ordinarily used. In any case the alkali is introduced in amount to establish the pH in this step approximately within the range about 7–9 and, for best commerical results, 7.8–8.2.

The condensations in both steps are effected at elevated temperatures, as under reflux in the first step until the reaction with furfuryl alcohol is substantially completed and at above 60° F., ordinarily at 65°–75° F., during the second step until the free formaldehyde content ceases to fall rapidly and the exothermic reaction ceases. External heating or cooling is applied, as may be necessary, during the condensation steps to control the rate of reaction or the vigor of refluxing.

The proportion of the curing catalyst may be varied widely, the amount depending upon the pot life required or speed of cure after the material is applied to sand or the like. Thus, we use 0.5–100 parts by weight and usually about 30–60 parts of the curing acid for 100 parts dry weight of the three-component condensate. In all cases, the amount of the curing catalyst is made adequate to neutralize any alkalinity remaining in the condensate solution and establish a pH below 5 and for best results below 4, e.g., 1–2.

The invention will be further illustrated by description in connection with the following specific examples of the practice of it, proportions here and elsewhere herein being expressed as parts by weight except where specifically stated to the contrary.

EXAMPLE 1

A condensate was made in the manner described above. The components used in the first condensation step were phenol 94 parts (1 mole), furfuryl alcohol 24 parts (0.245 mole), and maleic anhydride catalyst 0.15 part (0.0015 mole), with sufficient water to give a solution of 30% concentration of total solids (non-water components). The whole was refluxed, i.e., maintained at about 100° C., for about 1.5 hours.

Then there was added sodium hydroxide in the amount of 0.63 part dry weight (0.0157 mole) in the form of a water solution of 50% concentration of the sodium hydroxide and 1.75 moles of formaldehyde (52.5 parts) in the form of a 37% solution. This gave a pH of approximately 8.0. Refluxing was then resumed, but now at reduced pressure, so as to give a boiling point of about 70° C., and continued for 4 hours, after which time the content of free formaldehyde ceased to fall rapidly and there was no sign of further evolution of heat by the reaction. Water was then distilled from the mixture at a reduced pressure until the water content fell below 25% of the total mixture, as to a solution of 10% water content and of viscosity approximately 2,000 centipoises at 25° C.

There was then admixed additional furfuryl alcohol in the amount of 1 mole (98 parts), to give with the acid curing agent, after application to sand or the like, an exothermic reaction between said alcohol and acid and a resulting quick set of the adhesive composition.

The solution of the three-component condensate and excess furfuryl alcohol so made is ready for use in the bonding operation described.

We find particularly satisfactory results when we mix the catalyst of curing with the sand or the like before the resinous condensate is applied thereto.

In this example, we dissolved trichloroacetic acid as the curing catalyst in the amount of 23 parts (0.14 mole) in one-sixth its weight of water and mixed this solution thoroughly with the sand, the dilution by the water promoting the distribution of the catalyst over the particles of sand. When the mix had been made satisfactorily uniform, then we admixed the aqueous solution of the three-condensate made as described.

The sand, curing agent, and condensate mix was then formed into the desired core, mold or other shape to be used and allowed to stand at ordinary temperature until the condensate was cured to firm and bonding condition, as for 4 hours.

In an actual bonding, we used the specific conditions and proportions shown in the table below and compared the results with a control (C) which is no part of our invention but is comparable except for using a conventional curing catalyst, here phosphoric acid, in place of trichloracetic acid as the curing agent.

| Materials | Proportions, Conditions and Results | |
|---|---|---|
| | Our Composition | C-Control |
| Components: | | |
| Sand, parts | 45 | 45 |
| 3-Component resin, parts | 91 | 91 |
| Curing catalyst, parts | 27.3 | 27.3 |
| Conditions of application: Sand temperature, °F | 74 | 74 |
| Results: | | |
| Pot life of mix, min | 30 | 10 |
| Deep set time, hours | 4 | 1.25 |
| Tensile strength of bonded sand, p.s.i., after setting for— | | |
| 1 hr | 0 | 40 |
| 2.5 hrs | 45 | 55 |
| 3 hrs | 75 | 50 |
| 4 hrs | 120 | 50 |
| 24 hrs | 130 | 45 |
| Hardness after 24 hours | 85 | 60 |

The hardness figures above are the "scratch hardness" numbers determined by the Dietert machine, the upper limit of hardness on this scale being 100.

EXAMPLE 2

In another example of the invention, 800 lbs. of a foundry sand such as Jersey Silica, fineness No. 60; 16 lbs. of ferric oxide; and 8 lbs. of trichloracetic acid as catalyst were mixed for 1 minute. Then 21 lbs. of the phenol-furfuryl alcohol-formaldehyde condensate were applied in solution in an equal weight of water and the whole mixed for an additional 3 minutes. After 5 hours' setting, the tensile strength of the bonded sand was 168 p.s.i.

The ferric oxide in this example is used for its effect on the physical character of the bonded sand. It has no influence on the mechanism of action of the binder composition and catalyst and may be omitted.

EXAMPLE 3

The procedure and composition of Example 1 are used except that the curing acid which is applied to the sand, in advance of the said condensate, is selected from the group consisting of di-chloroacetic acid, mono-, di- and trifluoroacetic, propionic and butyric acids and unsubstituted oxalic acid, the selected acid being used separately.

The binder composition used as described meets the requirement in the art of casting metals against molded shapes containing the composition, in exluding nitrogen, boron, sulfur and phosphorus from the binder and in giving the other desirable results illustrated by the tabulated properties, particularly in Example 1.

EXAMPLE 4

For use not requiring quick initiation of setting (curing) of the adhesive, on contact with the acid curing agent, we use the procedure and composition of Example 1 but omit said additional 1 mole of furfuryl alcohol. The sole components used in making the condensate solution are, therefore, 1 mole of phenol, 0.0245 mole of furfuryl alcohol, 1.75 moles of formaldehyde, 0.0015 mole of maleic anhydride, and water.

It will be understood that it is intended to cover all changes and modifications of the examples of the invention herein chosen for the purpose of illustration which do not constitute departures from the spirit and scope of the invention.

We claim:

1. An acid curable binder comprising the combination of an aqueous solution of the condensate of about 1 mole of phenol, 0.2–0.5 mole of furfuryl alcohol and 1–3 moles of formaldehyde, 0.2–1.5 moles of additional furfuryl alcohol, and a water soluble acid curing agent therefor of dissociation constant above $10^{-2}$, the curing acid being selected from the group consisting of aliphatic acids consisting essentially of carbon, hydrogen and oxygen and halogen substitution products thereof and being used in amount to establish a pH below 5 in said solution.

2. The binder of claim 1, said curing agent being a substituted acetic acid in which 2–3 hydrogen atoms are replaced by chlorine.

3. The binder of claim 1, said curing agent being a substituted acetic acid in which 1–3 hydrogen atoms are replaced by fluorine.

4. The binder of claim 1, said curing agent being trichloroacetic acid.

5. In bonding particulate material, the process which comprises applying to said material a water soluble curing acid of dissociation constant above $10^{-2}$, and then applying thereto the combination of a phenol-furfuryl alcohol-formaldehyde condensate of about 1 mole of phenol, 0.2–0.5 moles of furfuryl alcohol and 1–3 moles of formaldehyde, admixed excess furfuryl alcohol in proportion of about 0.2–1.5 moles.

References Cited by the Examiner

UNITED STATES PATENTS

| | | | |
|---|---|---|---|
| 2,471,631 | 9/1944 | Lebach | 260—56 |
| 2,655,491 | 10/1953 | Edmunds et al. | 260—829 |
| 3,057,026 | 10/1962 | Blaies et al. | 260—829 |
| 3,113,361 | 12/1963 | Cooper et al. | 260—29.3 |

FOREIGN PATENTS 473,649   5/1951   Canada.

MURRAY TILLMAN, *Primary Examiner.*

J. C. BLEUTGE, *Assistant Examiner.*